Patented Apr. 24, 1934

1,956,424

UNITED STATES PATENT OFFICE 1,956,424

FLAKED VEGETABLE TISSUE FOR EXTRACTION

Ronald B. McKinnis, Pittsburgh, Pa., assignor to Continental Can Company, Inc., New York, N. Y., a corporation of New York No Drawing. Application January 25, 1933, Serial No. 653,546

1 Claim. (Cl. 99—11)

The invention relates to new and useful improvements in a leafy vegetable tissue prepared for extraction.

An object of the invention is to provide a leafy vegetable tissue in a form for extraction in which the extracting liquid will have ready and equal access to all parts of the leafy tissue.

While the invention is directed to the preparation of any leafy vegetable tissue for extraction by maceration and by percolation, it is particularly adapted for tea leaves, and will be described in detail in connection with the tea leaf prepared for extraction as a product.

The invention will be best understood by a description of the preferred method of making the product. The tea leaves are subjected first to a tempering action so that they become pliable, and then they are reduced by pressure to the form of thin flakes of such uniform thinness as to render the components therein substantially equally accessible to an extracting liquid. I have found in practice that if the tea leaf is reduced to a thinness of approximately .001 of an inch, then all of the component parts of soluble ingredients are immediately rendered equally accessible to the extracting liquid. I have also found that by tempering the tea leaves to render them pliable before reducing the same to the thin flaked condition, that a firm coherent flake is produced of sufficient extent as to breadth and length so as to greatly increase the efficiency of extraction either by maceration or percolation. The flakes thus produced from tea leaves are of irregular contour and may vary as to size from one-sixteenth to three-eighths of an inch.

The tea leaves are rendered pliable by supplying moisture thereto. This may be accomplished by applying a spray of water or a jet of steam to the tea leaves. Inasmuch as steam vaporizes the aroma, it is preferable to temper the tea by tumbling the same in a warm chamber, the atmosphere of which is saturated with water vapor. The tea slowly absorbs the moisture and becomes pliable. One or two days are ordinarily necessary for uniformly completing the tempering of the tea leaves.

After the tea leaves have been tempered, they are subjected to pressure for reducing the same to the very thin flake form. While the pressure may be produced by other means, I prefer to use rolls. The rolls are preferably heated and the tempered tea leaves are passed between the rolls. This subjects the leaves or portions thereof to a tremendous crushing pressure, thus reducing the leaf to a firm thin coherent flake having a thinness of approximately .001 of an inch, and this thinness is uniform throughout the entire extent of the flake. The flake is sufficiently firm so that it may be readily handled with little fracturing of the same. When black tea leaves are treated, the flake produced is a dark brown flake, while unfermented tea leaves produce a flake of slightly lighter green than before flaking. This preparation of the tea leaf produces an extracting product which may be brewed instantly in hot water, and the product is especially adapted for use in cloth tea bags. The thinness of the flake renders all of its ingredients substantially equally accessible to the extracting liquid, and this is what insures practically instant extraction when the liquid contacts therewith. The soluble ingredients of the tea leaf have been rendered so readily accessible to the extracting liquid that it will brew in cold water. In the usual method of making iced tea, hot water is used to brew the tea, and then this is cooled. By this method, a large amount of ice is necessary to cool the brew, and it also dilutes the brew during cooling, so that it is necessary to begin with a much stronger brew than is desired from the standpoint of palatability. By the use of the tea flakes described so that a brew may be made with cold water, there is a great saving both in the use of the ice and in the use of the tea, to produce a brew of a desired body.

By moistening the tea particles, it is possible to hydrate the fibers and gummy materials sufficently to cause them to flow during the rolling process, and also to insure their immediate wetting with subsequent settling of the flakes during brewing.

By the method described above of treating the tea leaves, a tea product is produced which may be brewed very quickly and which settles rapidly, leaving a brew that is clear. Furthermore, the tea product may be brewed in cold water, thus greatly saving expense incident to the cooling of the beverage, and the beverage produced by the use of the flaked tea leaves is of better color, flavor and consistency.

It is not necessary to use dried leaves, as the raw material from which the tea product is produced as tea leaves may be treated during the preparation of the tea from the fresh leaves. They may be at this time passed through rolls and reduced to thin flakes before or after partial drying, and thus a flaked tea product produced wherein the flake is of such uniform thinness that all of the soluble ingredients are equally and readily accessible to the extracting or brewing liquid.

While this invention has been described in detail as applied to the preparing of a tea product for extraction, it will be obvious that the invention may be applied to the preparation of any leafy tissues for extraction, such, for example, as substitutes for tea, among which may be mentioned the leaves of *Ilex paraquayensis* or *paraguariensis*, known colloquially as Paraguay tea, maté, yerva maté, or yerba maté; and *Ledum latifolium*, the Labrador tea. It also may be used for the preparation of leaves for extraction, such as the leaves digitalis. The leaves of *Digitalis purpurea* and related species of digitalis are largely used in medicine in the form of infusions, prepared by adding hot water to the drug and macerating without the further application of heat.

The above are given merely as examples of the uses to which the invention may be put. In each case, the leaf is tempered and reduced by pressure to this flaked form, which is of such uniform thinness throughout as to render all of the soluble ingredients readily accessible to the extracting liquid. The tempering of the leaves prior to the applying of pressure thereto also produces a firm coherent flake which remains intact and which aids in the producing of a clear brew. Furthermore, the swelling of the flakes produced by the action of the extracting liquid will not result in the clogging of the percolating apparatus so that the flow of the liquid will be impeded. The extracting liquid coming readily in contact with all of the flakes and the soluble ingredients therein greatly expedites the time of extraction with a resulting brew or percolate of better color, flavor and consistency.

Having thus described the invention, what I claim as new and desire to secure by Letters Patent, is:

A dry vegetable tissue product containing substantially all of its original extractible matter consisting of leafy vegetable tissues in the form of firm individual flakes, each having a coherent crushed fibrous structure containing many of the cells in a ruptured state and with the tissues thereof only partially disintegrated, which flakes are of such uniform thinness as to render the soluble ingredients thereof substantially equally accessible to an extracting medium.

RONALD B. McKINNIS.